United States Patent [19]

Fannin et al.

[11] Patent Number: 5,328,004
[45] Date of Patent: Jul. 12, 1994

[54] BYPASS VALVE ASSEMBLY FOR A HYDRAULIC DAMPER

[75] Inventors: Wayne V. Fannin, Xenia; James M. Pees, Centerville, both of Ohio

[73] Assignee: General Motors Corporation, Detroit, Mich.

[21] Appl. No.: 933,276

[22] Filed: Aug. 21, 1992

[51] Int. Cl.⁵ .............................................. F16F 9/348
[52] U.S. Cl. ................................... 188/318; 188/299; 188/281; 280/714
[58] Field of Search ............... 188/281, 282, 299, 313, 188/316, 318; 280/714

[56] References Cited

U.S. PATENT DOCUMENTS

| | | | |
|---|---|---|---|
| 3,125,186 | 3/1964 | Day | 188/88 |
| 3,702,646 | 11/1972 | Sherburne | 188/313 X |
| 4,650,042 | 3/1987 | Knecht et al. | 188/299 |
| 4,749,069 | 6/1988 | Knecht et al. | 188/299 |
| 4,785,920 | 11/1988 | Knecht et al. | 188/299 |
| 4,802,561 | 2/1989 | Knecht et al. | 188/318 |
| 4,832,162 | 5/1989 | Bacardit | 188/299 |
| 4,880,086 | 11/1989 | Knecht et al. | 188/299 |
| 4,936,423 | 6/1990 | Karnopp | 280/714 X |
| 4,960,188 | 10/1990 | Wössner | 188/299 |
| 4,986,393 | 1/1991 | Preukschat et al. | 188/299 |
| 4,988,967 | 1/1991 | Miller et al. | 335/279 |
| 5,011,113 | 4/1991 | Stobbs et al. | 251/129.16 |
| 5,024,460 | 6/1991 | Hanson et al. | 280/707 |

FOREIGN PATENT DOCUMENTS

| | | | |
|---|---|---|---|
| 1242945 | 6/1967 | Fed. Rep. of Germany . | |
| 2664008 | 1/1992 | France | 188/318 |
| 58-30814 | 2/1983 | Japan . | |
| 20210 | 1/1988 | Japan | 188/318 |
| 2001579 | 2/1992 | World Int. Prop. O. | 188/318 |

Primary Examiner—Robert J. Oberleitner
Assistant Examiner—Alfred Muratori
Attorney, Agent, or Firm—A. Michael Tucker

[57] ABSTRACT

A hydraulic suspension damper includes a fluid-filled cylinder divided into first and second fluid chambers by a reciprocating piston. A bypass valve assembly includes a first pressure responsive valve assembly in fluid connection with one of the fluid chambers and a second pressure responsive valve assembly in fluid connection with the other fluid chamber. The pressure responsive valve assemblies direct fluid to an unidirectional electromechanical valve assembly. Operation of the bypass valve assembly permits independent control of fluid during compression and rebound strokes of the damper.

17 Claims, 2 Drawing Sheets

5,328,004

BYPASS VALVE ASSEMBLY FOR A HYDRAULIC DAMPER

BACKGROUND OF THE INVENTION

1. Field of the Invention

The present invention relates generally to controllable hydraulic dampers for vehicular suspensions. In particular, the present invention is concerned with a bypass valve assembly for a hydraulic damper which provides independent control of fluid during compression and rebound strokes of the damper.

2. Description of the Related Art

Variable hydraulic dampers (shock absorbers and struts) are well-known. Many variable dampers include a fluid-filled cylinder divided by a reciprocating piston into first and second fluid chambers. A bypass channel is provided between the chambers and a bypass valve controls fluid flow in the bypass chambers. Oftentimes, a fast-acting solenoid valve is utilized as the bypass valve to provide real time variable damping. When the solenoid valve is energized (opened), fluid is routed through the less restrictive bypass channel, thereby providing a relatively soft damping rate. When the valve is deenergized (closed), fluid does not travel through the bypass channel, thereby providing a relatively firm damping rate as fluid travels through the restrictive piston valving.

The art continues to seek improvements. It is desirable to provide a bypass valve for a variable suspension damper capable of independently controlling fluid flow during compression and rebound strokes of a damper, thereby providing at least four modes of operation. Furthermore, it is desirable to provide an unidirectional bypass valve which can accommodate incoming flow from two sources, such as occurs in a monotube damper.

SUMMARY OF THE INVENTION

The present invention includes a variable hydraulic suspension damper having a bypass valve assembly between first and second chambers of a fluid-filled cylinder. The bypass valve assembly includes an electromechanical valve assembly capable of real time operation and first and second pressure responsive valve assemblies. The pressure valve assemblies receive a respective flow from either the first or second chamber and direct such flow to the electromechanical valve assembly. Energization of the electromechanical valve assembly produces a relatively soft damping rate by the damper. Deenergization of the electromechanical valve assembly produces a relatively firm damping rate by the damper. The first and second pressure valve assemblies can be independently tuned to provide a desired low level of damping for compression and rebound strokes of the damper.

In a preferred embodiment, a hydraulic suspension damper includes a fluid-filled cylinder divided into first and second fluid chambers by a reciprocating piston. A bypass valve assembly includes a first pressure responsive valve assembly in fluid connection with one of the fluid chambers and a second pressure responsive valve assembly in fluid connection with the other fluid chamber. The pressure responsive valve assemblies direct fluid to an unidirectional electromechanical valve assembly. Operation of the bypass valve assembly permits independent control of fluid during compression and rebound strokes of the damper.

DETAILED DESCRIPTION OF THE PREFERRED EMBODIMENT

Figure 1:
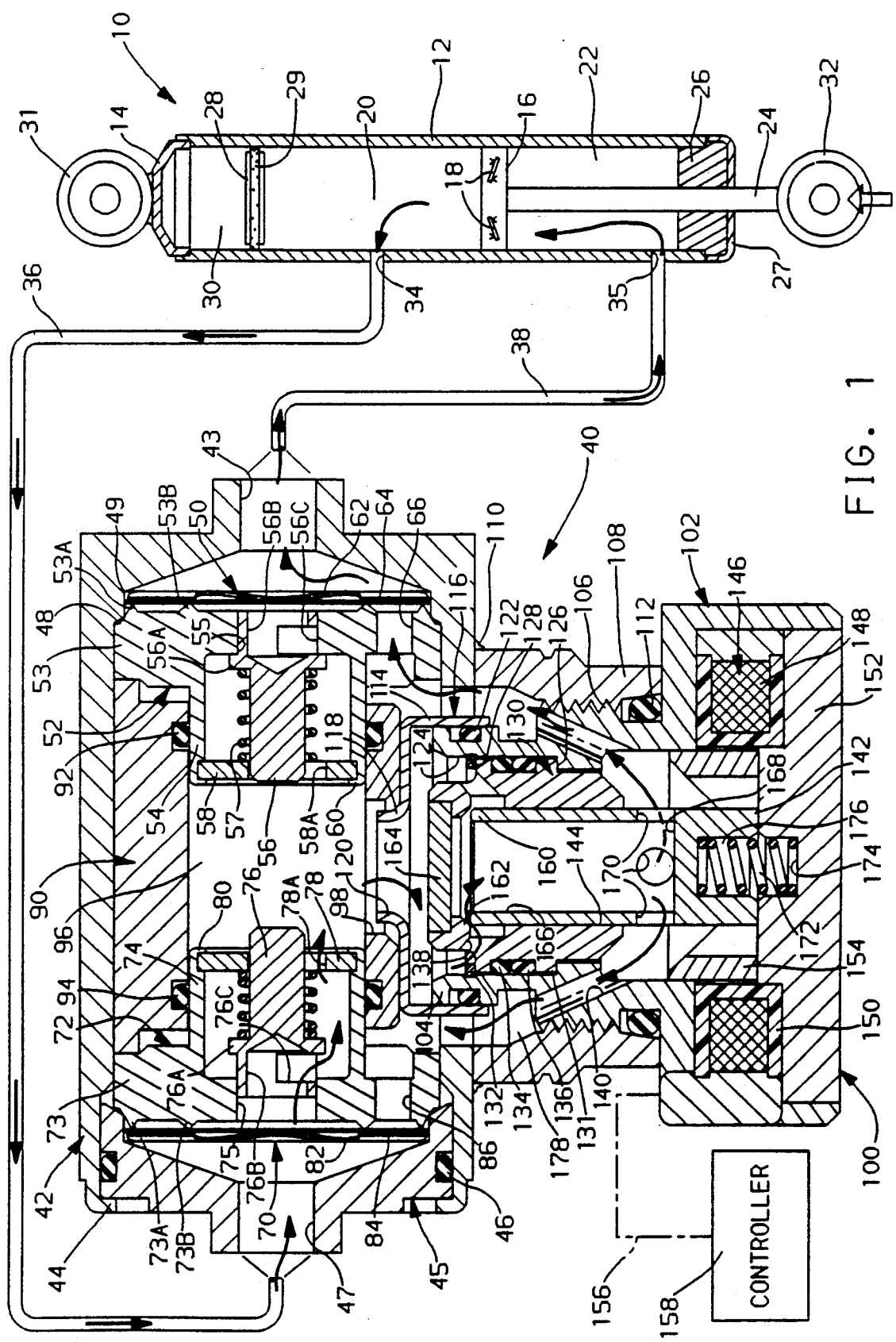
FIG. 1 is a schematic illustration of a monotube hydraulic damper connected to a greatly enlarged bypass valve assembly according to the present invention, illustrating fluid flow during a compression stroke of the damper when the bypass valve assembly is opened.
Figure 2:
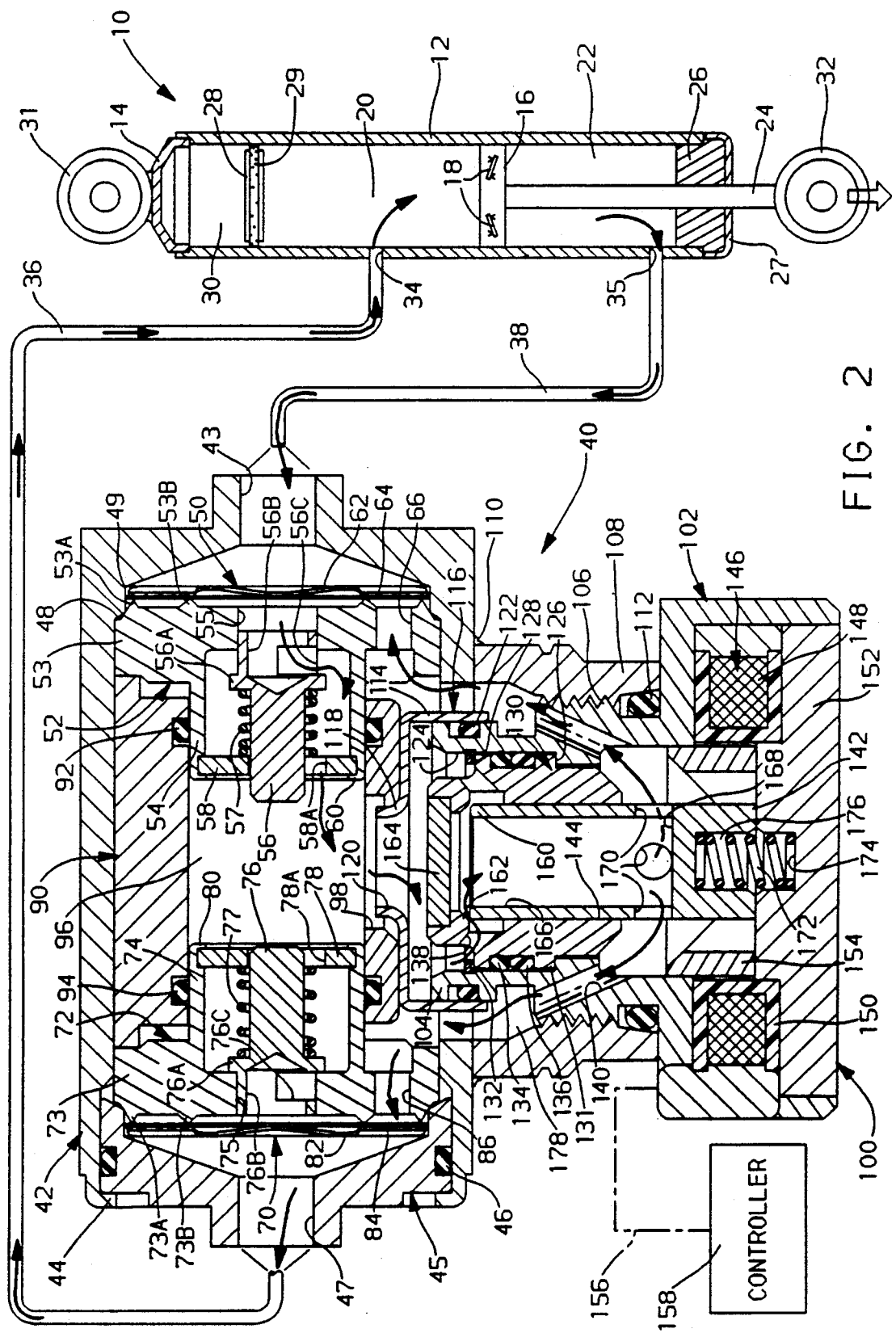
FIG. 2 is a view of the damper and bypass valve assembly of FIG. 1 illustrating fluid flow during a rebound stroke of the damper when the bypass valve assembly is opened.

A hydraulic damper 10 for vehicular suspension is schematically illustrated in FIGS. 1 and 2. The damper 10 of FIGS. 1 and 2 is shown as a monotube damper having a fluid-filled cylinder 12 sealed and closed at an upper end by an end cap 14. A piston 16 having internal valving 18 is slidably mounted in the cylinder 12 to divide an interior of the cylinder 12 into an upper fluid chamber 20 and a lower fluid chamber 22. A reciprocating piston rod 24 is attached at its innermost end to the piston 16 and is slidably received in a rod guide 26. A cover 27 closes and seals a lower end of the cylinder 12. A separator piston 28 including a circumferential seal 29 is slidably mounted in the cylinder 12 and separates a compensation chamber 30 filled with pressurized gas from the upper fluid chamber 20. Mounting fittings 31, 32 are provided to mount the damper 10 between sprung and unsprung portions of a vehicle in a well-known manner.

A bypass valve assembly indicated generally at 40 is schematically connected to the damper 10 and shown greatly enlarged in FIGS. 1 and 2 for purposes of clarity of illustration. The bypass valve assembly 40 can be used to provide variable damping as fluid flows between the upper and lower chambers 20, 22 caused by reciprocation of the piston 16 due to road inputs.

The bypass valve assembly 40 includes a housing 42 which can be mounted on the cylinder 12 or at a remote location, as is illustrated in FIGS. 1 and 2. The housing 42 secures first and second pressure valve assemblies 50 and 70 and an electromechanical valve assembly 100, preferably capable of operating in real time. In the embodiment illustrated in the figures, the housing 42 is formed as a generally cylindrical member having a fluid port 43 formed at a first end and an annular bendable flange 44 formed at the opposite end. A fitting 45 having a circumferential seal 46 forms a fluid port 47 opposite port 43. Flange 44 is crimped as illustrated to retain the fitting 45 inside the housing 42.

The bypass valve assembly 40 is connected to the damper 10 by a first conduit 36 leading from a port 34 in the upper chamber 20 to port 47 in the fitting 45 and a second conduit 38 leading from the port 35 in the lower chamber to port 43 in the housing 42.

The first pressure valve assembly 50 includes a valve cage 52 having a plate portion 53 and a skirt portion 54. A central opening 55 in the plate portion 53 slidably receives a valve stem 56. A compression spring 57 is seated at one end on an annular stop 56A on the valve stem 56 and seated at the opposite end on a slotted retainer 58. An annular flange 60 on the skirt portion 54 is crimped or rolled to secure the retainer 58 in the skirt portion 54. When the fluid pressure in port 43 reaches a predetermined level, the valve stem 56 compresses the spring 57 (as illustrated in FIG. 2) so that fluid may pass through an axial bore 56B and a transverse slot 56C of valve stem 56 and slots 58A in the retainer 58.

The valve cage 52 rests on a first annular step 48 provided in the inner diameter of the housing 42. A pair of annular seats 53A, 53B are formed on an outer surface of the plate portion 53 of the valve cage 52. A wave spring 62 seated in a second annular step 49 of the housing 42 retains valve disks 64 over orifices 66 formed through the plate portion 53. As described below, fluid in the orifices 66 can deflect the disks 64 to permit the passage of fluid to the port 43.

The second pressure valve assembly 70 is similar to the first pressure valve assembly 50 and includes a valve cage 72 having a plate portion 73 and a skirt portion 74, a valve stem 76 slidably mounted in opening 75, a compression spring 77, a retainer 78, valve disks 84, and a wave spring 82. The valve stem 76 is normally biased closed by the compression spring 77 seated between an annular stop 76A and the retainer 78. The retainer 78 is held in placed by a crimped flange 80 of the skirt 74. The wave spring 82 is biased against the valve disks 84 by the fitting 45. The disks 84 are seated on annular seats 73A, 73B to cover orifices 86 in the plate portion 73. An axial bore 76B and transverse slot 76C in the valve stem 76 permit fluid flow as the valve stem 76 compresses spring 77 (as illustrated in FIG. 1). The valve cage 72 is retained in the housing 42 by the secured fitting 45.

A cylindrical spacer 90 having O-ring seals 92 and 94 is provided between the first and second pressure valve assemblies 50 and 70 inside the housing 42. Seal 92 engages an outer surface of skirt 54 and seal 94 engages an outer surface of skirt 74. Fluid exiting the first and second pressure valve assemblies 50 and 70 through respective slots 58A and 78A is received in a fluid working chamber 96 formed between skirts 54 and 74. Fluid is directed by a port 98 formed in the spacer 90 to the electromechanical valve assembly 100.

The electromechanical valve assembly 100 is preferably formed as a solenoid valve having a housing 102 with a body portion 104. Preferably, threads 106 are formed on an outer surface of the body portion 104 which are mated with threads formed on an inner surface of a cylindrical valve boss 108 secured to the housing 42 by any suitable means, e.g., by welding as illustrated at 110. 0-ring seal 112 provides a fluid seal between the housing 102 and the valve boss 108.

A leading end of the body portion 104 is received within an inner surface of an annular wall 114 of a seal cup 116. The seal cup 116 includes a protruding neck 118 having a port 120 which is in fluid communication with the working chamber 96. As the housing 102 is threaded into the valve boss 108, the seal cup 116 is urged toward and seals against the spacer 90 as the neck 118 is received inside the port 98. O-ring seal 122 provides a fluid seal between the body portion 104 and the seal cup 116.

A central bore 124 of the body portion 104 includes an annular shoulder 126 and a groove 128. An insert 130 is positioned within the bore 124 so that an annular stop 131 rests against the shoulder 126. The insert 130 is retained by a snap ring 132 received in the groove 128. 0-ring seals 134, 136 provide a fluid seal between the insert 130 and the body portion 104.

The insert 130 includes inlet ports 138 which are in fluid communication with the working chamber 96 via the seal cup 116. Fluid flow from the inlet ports 138 to outlet ports 140 formed in the body portion 104 is regulated by the position of a poppet 142 which is slidably mounted within a central bore 144 of the insert 130.

An actuator 146 controls in part the position of the poppet 142. The actuator 146 is preferably formed as a coil 148 wound on a bobbin 150 and sealingly retained to the housing 102 by an end portion 152. A disc armature 154 formed of a suitable metallic material is press fit or otherwise secured to the poppet 142. Current is delivered to the coil 148 via an encapsulated wire 156 which is electrically connected to a controller 158.

The poppet 142 has a sealing end 160 normally held in contact with a valve seat 162 formed in an interior surface of bore 144. A sealing plate 164 is attached to the insert 130 and closes bore 144. A central bore 166 of the poppet 142 is open at the sealing end 160 and extends longitudinally through the poppet 142 until terminating in a pressure wall 168. A plurality of radial cross bores 170 are formed in the poppet 142 adjacent the pressure wall 168. A compression spring 172 is seated in a recess 174 in the end portion 152 and a spring chamber 176 in the poppet 142 to bias the poppet 142 away from the end portion 152 and urge the sealing end 160 into contact with the valve seat 162.

When the actuator 146 is energized by the controller 158, the poppet 142 is pulled against the compression spring 172 so that the sealing end 160 moves away from the valve seat 162. Fluid travels from the inlet ports 138 through the central bore 166 and cross bores 170 to reach the outlet ports 140. A return chamber 178 formed in the volume surrounding the seal cup 116 directs fluid back into the housing 42 to orifices 66 and 86. When fluid pressure in the return chamber 178 is greater than the fluid pressures in the ports 43 and 47 opposite the valve disks 64, 84 and the spring forces from wave springs 62, 82, fluid forces the disks 64, 84 away from their respective seats to permit fluid to return to the fluid conduits 36, 38.

Four modes of operation are available with the damper 10 and bypass valving assembly 40 to provide variable damping.

During a compression stroke of the damper 10 (i.e., when the piston 16 is traveling toward the end cap 14) when the bypass valve assembly 40 is not energized and thus closed, fluid travels from the upper chamber 20 through the piston valving 18 to reach the lower chamber 22. The piston valving 18 is designed so that a relatively firm damping rate is provided in this mode.

When the bypass valve assembly 40 is energized and thus opened during a compression stroke (the specific fluid path illustrated in FIG. 1), fluid travels from the upper chamber 20 through the conduit 36 to the second pressure valve assembly 70. The valve stem 76 is forced against compression spring 77 and slides to the right to provide a low level of damping. Fluid exits the working chamber 96 and travels through the inlet ports 138, central bore 144 and outlet ports 140 of the electromechanical valve assembly 100 to reach the return chamber 178. Fluid pressure at port 47 ensures the closure of the valve disks 84, and fluid returns to the lower chamber 22 through deflected valve disks 64 and conduit 38 since fluid pressure at port 43 is less than the fluid pressure in the return chamber 178. Also, valve stem 56 remains closed by compression spring 57.

When the electromechanical valve assembly 100 is opened, fluid flow is less restricted than that through piston valving 18, and thus provides a relatively soft damping rate. However, pressure valve assembly 70 provides a desirable level of damping less than the relatively firm rate through the piston valving 18. Thus, the controller 158 can select two levels of damping during a compression stroke by energizing and deenergizing the bypass valve assembly 40.

During a rebound stroke of the damper 10 (i.e., when the piston 16 is traveling toward the rod guide 26) when the bypass valve assembly 40 is not energized and thus closed, fluid travels from the lower chamber through the piston valving 18 to reach the upper chamber 20. The piston valving 18 is designed so that a relatively firm damping rate is provided in this mode.

When the bypass valve assembly 40 is energized and thus opened during a rebound stroke (the specific fluid path illustrated in FIG. 2), fluid travels from the lower chamber 22 through the conduit 38 to the first pressure valve assembly 50. The valve stem 56 is forced against compression spring 57 and slides to the left to provide a low level of damping. Fluid exits the working chamber 96 and travels through inlet ports 138, central bore 144 and outlet ports 140 of the electromechanical valve assembly 100 to reach the return chamber 178. Fluid pressure at port 43 ensures the closure of the valve disks 64, and fluid returns to the upper chamber 20 through deflected valve disks 84 and conduit 36 since fluid pressure at port 47 is less than the fluid pressure in the return channel 178. Also, valve stem 76 remains closed by compression spring 77.

The damper 10 provides a relatively soft rebound damping rate when the electromechanical valve assembly 100 is opened. However, pressure valve assembly 50 provides a desirable level of damping less than the relative firm rate through piston valving 18. Thus, the controller 158 can select two levels of damping during a rebound stroke by energizing and deenergizing the bypass valve assembly 40.

The present bypass valve assembly 40 provides separate control of both compression and rebound fluid flow prior to entering the electromechanical valve assembly 100. Different damping levels can be provided by the first and second pressure valve assemblies 50 and 70 by selecting a desired spring rate for compression springs 57 and 77.

Although the present invention has been described with reference to a preferred embodiment, workers skilled in the art will recognize that changes may be made in form and detail without departing from the spirit and scope of the invention. For example, many embodiments of a housing for containing the first and second pressure valve assemblies 50, 70 and the electromechanical valve assembly 100 are easily envisioned. Also, while the electromechanical valve assembly 100 is illustrated as an off/on solenoid valve, it is appreciated that a continuously-variable solenoid valve can be substituted for assembly 100. Furthermore, the present bypass valve assembly 40 can be adapted for use with hydraulic struts and shock absorbers other than the monotube damper 10 of FIGS. 1 and 2.

The embodiments of the invention in which an exclusive property or privilege is claimed are defined as follows:

1. A hydraulic suspension damper comprising:
   (a) a cylinder containing damping fluid;
   (b) a piston, slidably mounted in the cylinder, dividing an interior volume of the cylinder into first and second fluid chambers;
   (c) means for controlling damping fluid through the piston as the piston slides in the cylinder;
   (d) means for bypassing the damping fluid from one of the cylinder chambers to the other cylinder chamber;
   (e) the bypassing means including bypass valve means for controlling damping fluid flow in the bypassing means; and
   (f) the bypass valve means having first valving means connected to one of the fluid chambers, second valving means connected to the other fluid chamber, and third valving means connected in series with the downstream from the first and second valving means so that all of the damping fluid passing through the first and second valving means also passes through the third valving means, wherein the first and second valving means each include deflectable disks for returning fluid from the third valving means to the cylinder.

2. The damper as specified in claim 1 wherein the first, second and third valving means operate independently.

3. The damper as specified in claim 1 wherein:
   (a) the first valving means is pressure responsive;
   (b) the second valving means is pressure responsive; and
   (c) the third valving means is an electromechanical valve.

4. An adjustable hydraulic damper comprising:
   (a) a fluid-filled cylinder divided into first and second fluid chambers by a valved, reciprocating piston;
   (b) first conduit means connected to the first fluid chamber;
   (c) second conduit means connected to the second fluid chamber;
   (d) bypass valve means having first port means connected to the first conduit, second port means connected to the second conduit means, first pressure responsive means including inlet means to admit fluid from the first port means and outlet means to direct fluid to the first port means, wherein the outlet means of the first pressure responsive means includes deflectable disks, second pressure responsive means including inlet means to admit fluid from the second port means and outlet means to direct fluid to the second port means, and controllable valve means for receiving fluid from the first and second pressure responsive means and directing such fluid to the outlet means of the first and second pressure responsive means.

5. The damper specified in claim 4 wherein the first and second pressure responsive means and the controllable valve means operate independently.

6. The damper specified in claim 4 wherein the inlet means of the first pressure responsive means includes an axially slidable element.

7. The damper specified in claim 4 wherein the inlet means of the second pressure responsive means includes an axially slidably element.

8. The damper specified in claim 4 wherein the outlet means of the second pressure responsive means includes deflectable disks.

9. The damper specified in claim 4 wherein the controllable valve means includes an electromechanical valve.

10. The damper specified in claim 9 wherein the electromechanical valve is a solenoid valve.

11. An adjustable hydraulic damper including a fluid-filled cylinder divided into first and second fluid chambers by a valved, reciprocable piston, and bypass means for bypassing fluid from one of the fluid chambers to the other fluid chamber, and bypass valve means for controlling fluid flow through the bypass means, the bypass valve means comprising:

(a) a housing having first and second port means;

(b) a first pressure valve assembly having inlet means for admitting fluid from the first port means and outlet means for selectively directing fluid to the first port means;

(c) a second pressure valve assembly having inlet means for admitting fluid from the second port means and outlet means for selectively directing fluid to the first port means;

(d) a working chamber for receiving fluid admitted by the inlet means of the first and second pressure valve assemblies;

(e) a controllable valve assembly having an inlet for receiving fluid from the working chamber and an outlet; and (f) a return chamber providing fluid communication between the outlet of the controllable valve assembly and the outlet means of the first and second pressure valve assembly.

12. The damper specified in claim 11 including a cylindrical spacer, provided between the first and second pressure valve assemblies, forming boundaries for the working chamber.

13. The damper specified in claim 11 including a seal cup, receiving the inlet of the controllable valve assembly, having a neck in fluid communication with the working chamber.

14. The damper specified in claim 11 wherein the inlet means of each of the first and second pressure valve assemblies includes a spring biased component.

15. The damper specified in claim 11 wherein the outlet means of each of the first and second pressure valve assemblies includes a spring biased component.

16. The damper specified in claim 11 wherein the controllable valve assembly is an electromechanical valve assembly.

17. The damper specified in claim 11 wherein all the fluid passing through the inlet means of the first and second pressure valve assemblies passes through the controllable valve assembly.

* * * * *